United States Patent
Plantan et al.

(10) Patent No.: US 9,004,236 B2
(45) Date of Patent: Apr. 14, 2015

(54) PARKING BRAKE PISTON FOR A PARKING BRAKE CHAMBER

(75) Inventors: Ronald S. Plantan, Mooresville, NC (US); Brett S. Darner, Wellington, OH (US)

(73) Assignee: Bendix Spicer Foundation Brake, LLC, Elyria, OH (US)

( * ) Notice: Subject to any disclaimer, the term of this patent is extended or adjusted under 35 U.S.C. 154(b) by 173 days.

(21) Appl. No.: 13/247,449

(22) Filed: Sep. 28, 2011

(65) Prior Publication Data

US 2013/0075211 A1 Mar. 28, 2013

(51) Int. Cl.
| | | |
|---|---|---|
| B60T 13/38 | (2006.01) | |
| F16D 65/16 | (2006.01) | |
| B60T 1/06 | (2006.01) | |
| B60T 17/08 | (2006.01) | |
| F16D 65/28 | (2006.01) | |
| F16D 121/10 | (2012.01) | |

(52) U.S. Cl.
CPC ............ B60T 17/083 (2013.01); F16D 65/28 (2013.01); F16D 2121/10 (2013.01); B60T 17/088 (2013.01)

(58) Field of Classification Search
CPC ..... F16B 15/10; F16D 2121/12; F16D 59/00; F16D 59/02; F16D 2055/0058; F16D 55/40; B60T 13/22; B60T 17/083; B60T 17/085; B60T 17/086; B60T 17/08; B60K 28/06; F16J 3/02; F04B 43/0054
USPC .......... 188/70 R, 106 F, 170, 1.11 W, 1.11 R; 92/40, 101, 84, 255, 63, 3, 99, 100
See application file for complete search history.

(56) References Cited

U.S. PATENT DOCUMENTS

| | | | | |
|---|---|---|---|---|
| 2,977,935 | A * | 4/1961 | Randol | 91/369.4 |
| 3,152,524 | A | 10/1964 | Newell | |
| 3,508,469 | A * | 4/1970 | Williams | 92/63 |
| 3,712,181 | A * | 1/1973 | Swander et al. | 92/63 |
| 3,811,365 | A * | 5/1974 | Gordon et al. | 92/63 |
| 4,263,840 | A * | 4/1981 | Herrera | 92/63 |
| 4,960,036 | A * | 10/1990 | Gummer et al. | 92/63 |
| 5,014,599 | A | 5/1991 | Kocsis et al. | |
| 5,791,232 | A * | 8/1998 | Smith | 92/128 |
| 5,836,233 | A * | 11/1998 | Rumsey | 92/63 |
| 6,289,786 | B1 | 9/2001 | Plantan et al. | |
| 7,343,847 | B2 | 3/2008 | Scheckelhoff et al. | |
| 7,847,242 | B2 | 12/2010 | Wang et al. | |
| 2010/0154627 | A1 * | 6/2010 | Prager et al. | 92/63 |

OTHER PUBLICATIONS

International Search Report dated Nov. 19, 2012 (Two (2) pages).
Written Opinion (PCT/ISA/237) dated Nov. 19, 2012 (Six (6) pages).
International Preliminary Report on Patentability (PCT/IB/373) including Written Opinion (PCT/ISA/237) dated Apr. 1, 2014 (seven (7) pages).

\* cited by examiner

Primary Examiner — Anna Momper
Assistant Examiner — San Aung
(74) Attorney, Agent, or Firm — Crowell & Moring LLP

(57) ABSTRACT

A spring-type brake actuator for a pneumatically-operated vehicle brake is provided, in which the parking brake release piston is formed from at least one stamped actuator piston plate, preferably a stamped aluminum plate. Preferably the biasing force of the power spring of the spring brake actuator bears on a stamped spring seat cap element which is interposed between the power spring and the stamped actuator piston plate. In addition, the parking brake release piston flexible diaphragm may be captured between the stamped actuator piston plate and a stamped backing plate by affixing the backing plate to a joining member, where the joining member includes a threaded insert to receive a manually-actuated parking brake release actuation tool.

18 Claims, 3 Drawing Sheets

PARKING BRAKE PISTON FOR A PARKING BRAKE CHAMBER

BACKGROUND AND SUMMARY OF THE INVENTION

The present invention relates to a spring-type brake actuator for the braking system for a vehicle, and in particular to a piston configuration for such an actuator.

It is well known to employ so-called "spring brake" actuators to provide service, parking and emergency brake operation on vehicles such as commercial trucks, tractors and trailers equipped with lever-operated drum or disc brakes. Spring-type brake actuators are typically pneumatically operated, and are supplied with operating air from a compressed air source on the vehicle. These actuators also typically are arranged in a "fail-safe" manner, i.e., where the actuator defaults to a brake application state upon loss of operating air pressure.

An example prior art spring brake actuator is shown in cross-section view in FIG. 1. Actuator housing 1 includes a rear cylinder 2 in which a rear piston 3 is displaceably arranged. The inner wall of the rear cylinder and a chamber-side of the rear piston define a rear ventilation chamber 4. The other side of the rear piston bears on a brake actuator spring 5. This spring is also known in the art as a "power spring" or a "parking brake spring," and these terms may be used interchangeably.

The rear ventilation chamber is isolated from the spring side of piston 3 by an annular seal 6. An intermediate flange 8 (also known as a "wall") separates rear cylinder 2 from a front cylinder 9. The intermediate flange 8 traversed by a seal 10 through which passes a parking brake application rod 11, formed as an extension of rear piston 3. The parking brake application rod 11 can be displaced in the intermediate flange 8 by the rear piston. A front ventilation chamber 7 within front cylinder 9 is delimited by the cylinder inner wall and a front piston 13 and annular diaphragm 14. The rear piston 3 and the front piston 13 are in non-coupled contact with one another by means of the parking brake application rod 11, such that the front piston 13 can be displaced in a brake application direction by the rear piston 3 and/or by the application of pneumatic pressure in front ventilation chamber 7. An actuating rod 15 for actuating a brake lever of a vehicle brake is provided on the front side of the front piston 13.

FIG. 1 also shows mounting studs 16 provided for mounting of the actuator 1 on the vehicle brake, as well as a light return spring 18 which biases front piston 13 toward the rear of front chamber 7.

When no pneumatic pressure is present in the FIG. 1 actuator unit, the brake actuation spring 5 applies a high spring force to rear piston 3, which in turn applies this force via parking brake application rod 11 to front piston 13 to cause the actuator rod 15 to apply the vehicle brake. In this state, the vehicle brake functions as a parking brake, preventing vehicle movement.

When release of the parking brake is desired, the rear ventilation chamber 4 is filled with compressed air via a ventilation port (not illustrated). As the force generated by the increasing air pressure on the front side of rear piston 3 exceeds the force generated by brake application spring 5, the rear piston 3 and parking brake application rod 11 move toward the rear of the rear cylinder 2, compressing spring 5 and causing air in the rear of rear cylinder 2 to be vented to atmosphere through passages in rear piston 3 (not illustrated) to vent path 19.

As parking brake application rod 11 moves towards the rear, the force previously applied to front piston 13 is relieved, and the return spring 18 biases the front piston 13 toward the rear of front cylinder 9, thereby withdrawing actuating rod 15 away from and releasing the vehicle brake. The vehicle therefore moves from a state in which it is braked by the brake actuator spring 5, to a non-braked state in which the vehicle may be moved. The vehicle brake is applied as a service during normal operation by admitting compressed air into the front ventilation chamber 7 (via a port not shown in FIG. 1). Because air pressure in rear ventilation chamber 4 continues to hold parking brake application rod 11 at the rear of the rear cylinder 2, the front piston 13 and actuating rod 15 are free to move forward and backward within the front cylinder as necessary to respond to the operator's brake actuation demands.

The parking brake piston in a spring brake actuator (in the FIG. 1 example, rear piston 3) may be a relatively complex structure, and therefore typically is formed in one piece as a cast part. The cast piston is most commonly cast from Aluminum, a material with desirable light weight and suitability for using in casting processes.

Although cast aluminum parking brake pistons are relatively low cost, they are subject to large fluctuations in cost due to large Aluminum material market price fluctuations. Moreover, the tooling used for forming cast Aluminum pistons tends to be relatively short-lived, on the order of only 100,000 casting shots before the tooling must be replaced. This short tooling life raises the cost of the case Aluminum piston parts over which the tooling costs are distributed. Cast Aluminum parking brake pistons also typically require costly machining operations to prepare their surfaces for use with rubber diaphragms, as well as for receiving parking brake release rods and finishing of ventilation features.

In view of the foregoing problems with current spring-type brake actuator parking brake pistons and related actuator components, the present invention provides an improved parking brake piston and spring brake actuator which, as compared to prior art cast parking brake pistons, is simpler and less costly to manufacture and assemble, reduces stresses on the actuator housing when the parking brake piston is manually withdrawn with a parking brake release tool, and allows the use of self-ventilating chambers and thus eliminate the need to have external breathing and its associated corrosion problems.

In the present invention the previous cast aluminum parking brake piston is replaced by a stamped piston arrangement, in which a stamped disk is affixed to the parking brake actuator diaphragm, preferably with the diaphragm captured between opposing stamped plates. The use of stamping permits the use of stamping tooling which is much longer-lived than cast tooling (typically on the order of one million stampings before tooling replacement, as compared to typically on the order of 100,000 casting shots before the casting tooling must be replaced). Preferably, the stamped piston design includes a threaded insert which secures the parking brake piston to the parking brake retraction rod, a feature which on an equivalent cast aluminum parking brake piston tooling would require expensive side features to be included with the casting die. The present approach thus provides an economical way to provide for manual retraction of the parking brake actuator in a manner already familiar to vehicle operators and technicians. The threaded insert may be formed or attached to the stamped piston in a variety of ways, for example, by spot-welding to the stamped piston. Further, a pressed-in threaded insert may be used with the stampings, as such an insert permits the use of a larger diameter breather valve arrangement than in a cast parking brake piston.

In a preferred embodiment, the stamped piston is paired with a spring seat cap element, also preferably formed by stamping, which abuts the stamped piston on the power spring side of the piston. The spring seat cap element further may be arranged to receive the brake-side end of the power spring, such that the force of the spring is borne by the spring seat cap element instead of being directly applied to the stamped piston plate. This configuration permits the use of a stamped piston plate and a spring seat cap element with thicknesses which are individually insufficient to sustain the axial force generated by the power spring, but when combined are sufficient to successfully manage the force of the power spring as a result of the effective doubling of the thickness of these stamped components in the region of the brake-side end of the power spring. This permits the use of unexpectedly thin, less costly parking brake release piston components (less costly in terms of both material costs and production costs (e.g., lower tooling costs due to use of thinner material sheets which do not require high-force stamping presses and which do not wear tooling as quickly as thicker materials), while still providing sufficient strength to bear the loads applied to the parking brake release piston by the power spring.

Because no significant tension loads must be carried through the spring seat cap element and the stamped piston plate, there is no need to provide a strong bonding between these components, such as a full circumferential weld of the cap to the piston. As a result, costly and time consuming rig high tensile strength joining methods, such as full peripheral welding, riveting, or use of fasteners may be eliminated. In some applications, it may be desirable to lightly spot-weld the spring seat cap element to the stamped piston to aid actuator assembly by ensuring concentric arrangements of these components. Alternatively, because these components are only loaded in compression relative to one another, in some applications the fixing of the spring seat cap element to the stamped piston plate may be dispensed with altogether. It is further advantageous if the spring seat cap element has a generally conical shape above the stamped piston, an arrangement which provides for greater resistance against deformation in tension or compression than a cylindrically-configured cap element (for example, when a manual brake retraction tool pulls on the cap element, or when the top of the cap element serves as a piston travel stop against the rear of the power spring chamber).

The design also may include a diaphragm-to-rod sealing element and an internal breathing arrangement within the stamped parking brake piston center arrangements to permit chamber breathing, eliminating any need to allow outside environmental air to enter the power spring portion of the spring housing and thereby eliminating the potential for contaminant entry into the brake actuator housing. A stamped spring seat cap element also provides for a larger internal volume under the cap for elements such as breather valves than was typically available in prior art cast parking brake release piston designs.

In a further embodiment, the parking brake retraction rod passes through an intermediate flange of the brake actuator, and has a plate or equivalent structure affixed to the end of the rod on the side of the intermediate flange opposite the parking brake actuator. With such an arrangement, once sufficient pressure is present to fully retract the parking brake piston to the point that the plate at the end of the rod abuts the intermediate flange of the actuator housing, (for example, at approximately 70-75 psi), any further increases in pressure (for example, an increase to a system pressure of 135 psi) results in the additional pressure load advantageously being carried by the intermediate flange, rather than the parking brake section's portion of the housing (also known as the spring housing) as is typical with prior art conventional brake actuators, whose parking brake pistons apply all of their axial loads through the compressed power spring to the end of the housing. Thus, the present invention permits design of the parking brake housing portion of the actuator to significantly lower stress levels, enabling further weight and cost reductions as compared to prior art actuators.

The material used for the stamped piston may be a naturally corrosion-resistant material such as aluminum, or may be a material such as steel to which a corrosion-inhibiting coating is applied. In view of the decreased exposure to external environmental contaminants in the present invention, additional corrosion-inhibiting coatings may be dispensed with altogether.

Other objects, advantages and novel features of the present invention will become apparent from the following detailed description of the invention when considered in conjunction with the accompanying drawings.

DETAILED DESCRIPTION OF THE DRAWINGS

Figure 1:
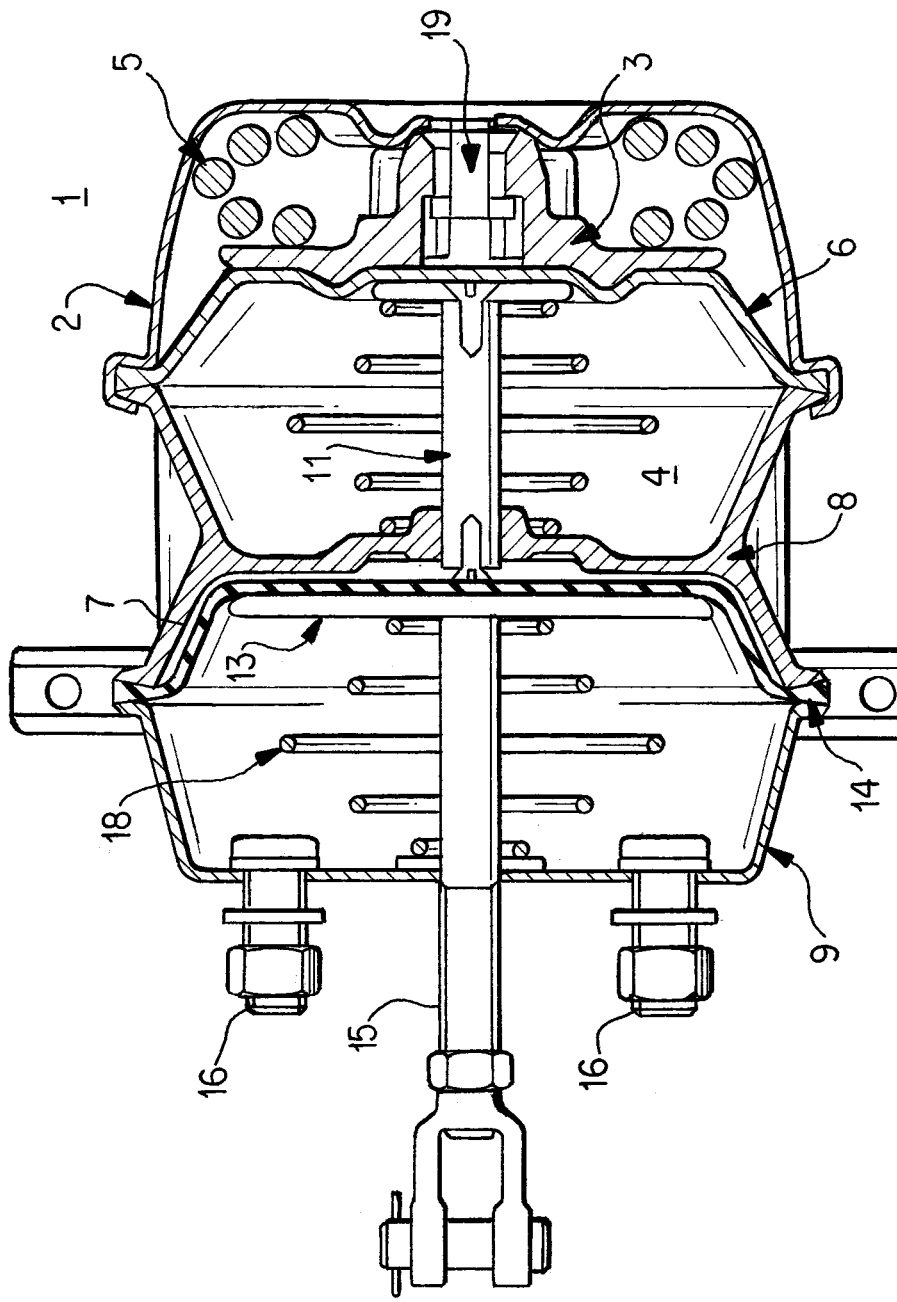
FIG. 1 is a cross-section view of an example of a previously known spring-type pneumatic brake actuator.
Figure 2:
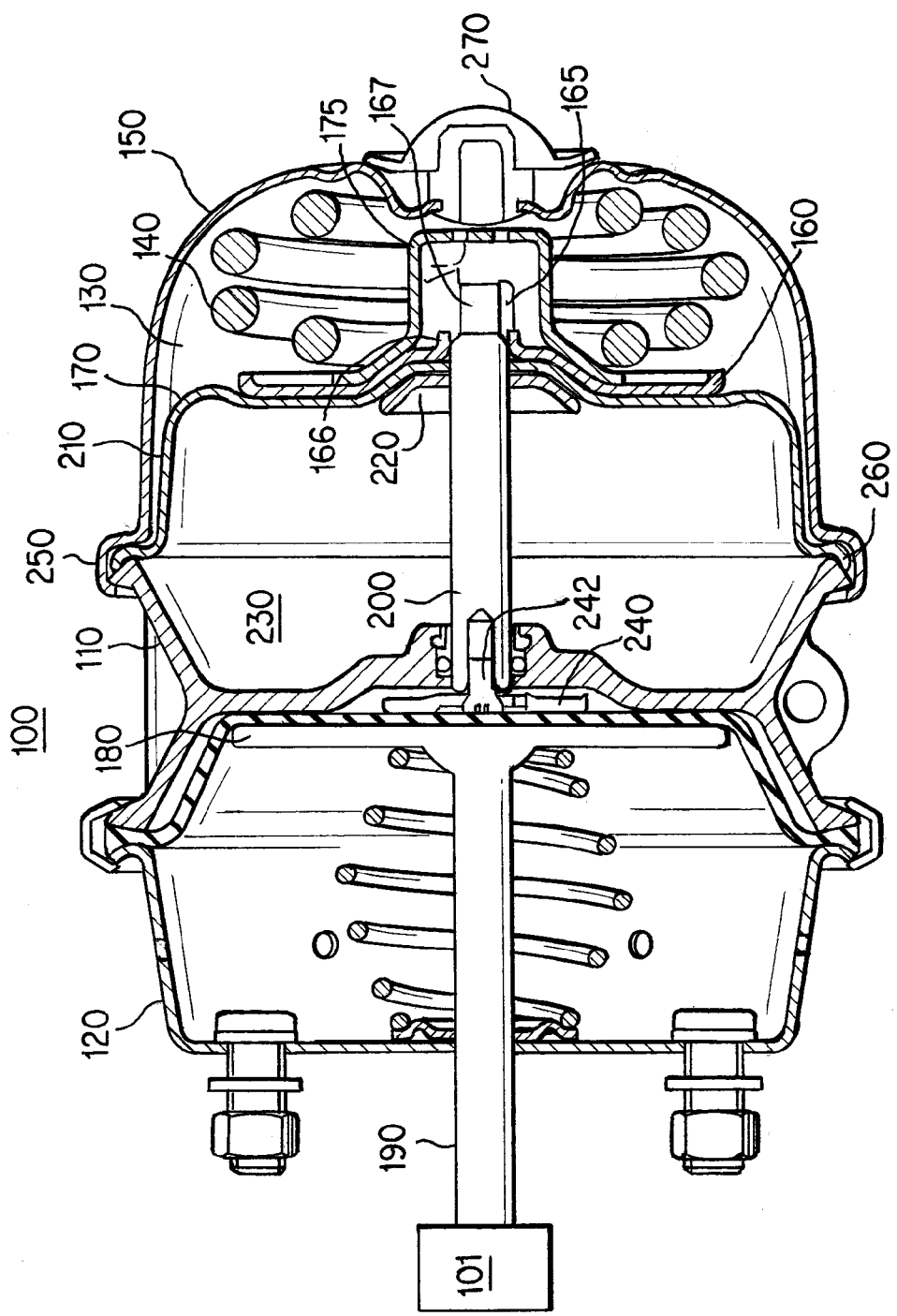
FIG. 2 is a cross-section view of an embodiment of a spring-type brake actuator in accordance with the present invention.

FIG. 2 is a cross-section view of a spring-type brake actuator 100 in accordance with a first embodiment of the present invention.

The actuator housing comprises an intermediate flange 110, front cylinder 120 at a vehicle brake end of spring brake actuator 100, and rear cylinder 130 on the opposite side of intermediate flange 110. The terms "front" and "rear" as used herein describe the directions facing toward and facing away, respectively, a vehicle brake to which the actuator 100 is to be mounted. Thus, in FIG. 2, "front" is the direction toward the left side of the figure, and "rear" is the direction toward the right side of the figure.

The operating elements of spring brake actuator 100 include a brake actuator spring 140, which has one end resting on an inside rear face of spring housing 150, and an opposite end resting on a rear-facing side of a parking brake release piston 170. It is to be understood that the present invention is not limited to a coil spring, but includes any member which provides the energy storage and return function required by a parking brake actuator. For example, alternative spring configurations, including multiple coil springs, leaf springs, cantilevered springs, etc., and alternative elements such as resilient blocks or chargeable high pressure bladders, are within the scope of the present invention.

Also included in spring brake actuator 100 are service brake actuator 180, brake actuator rod 190 and parking brake application rod 200. The spring brake actuator 100 is mounted on schematically-illustrated vehicle axle and brake unit 101, with brake actuator rod 190 connected to an operating member of the brake (which may be, for example, a drum brake or disk brake).

The parking brake release piston 170 in this embodiment comprises a diaphragm 210 captured between a supporting backing plate 220 within the rear chamber (the chamber being formed when spring housing 150 is mated to intermediate flange 110) and stamped parking brake piston 160. In this embodiment, the backing plate 220 and stamped piston 170 are joined by a joining member, in this embodiment a press-fit threaded bore section 165, under a spring seat cap 175. In this example, the spring seat cap has a height which assists in controlling the depth of retraction of the parking brake release piston 170 when the piston 160 is manually retracted.

As the brake end of parking brake application rod 200 is affixed a travel limiting member, in this embodiment a disk-shaped plate 240 secured by fastener 242. The travel limiting member may have any configuration (round, square, oval, etc.), and specifically need not be a plate member, as long as (whatever its shape) it abuts the intermediate flange 110 and transfers pressure loads from the parking brake release piston 170 to the intermediate flange 110 when the parking brake release piston 170 reaches the fully-retracted position, and as long as the travel limiting member can transfer parking brake actuation force from the parking brake application rod 200 to the service brake actuator 180 to cause brake actuator rod 190 to actuate the brake.

In this embodiment, the spring housing 150 of rear cylinder 130 is a lightweight aluminum cap whose bead flange 250 cooperates with a corresponding bead of intermediate flange 110 to capture an outer rim 260 of rear diaphragm 210 therebetween. In order to minimize manufacturing and material costs, the bead flange 250 here has simply been rolled over and crimped to secure the spring housing 150 to intermediate flange 110. Alternatively, a joint, such as a clamping ring, may be provided if the capability to remove the spring housing 150 in the field is desired, for example to enable replacement of a diaphragm or an internal seal.

Parking brake release piston 170 is shown in FIG. 2 in the fully withdrawn position at the rear of parking brake release chamber 230. This position is achieved when sufficient pneumatic pressure to overcome the spring force developed by brake actuating spring 140 has been supplied, via a supply port (not illustrated), to the portion of release chamber 230 between the diaphragm 210 and the rear side of intermediate flange 110. The portion of the chamber on the opposite side of diaphragm 210, is sealed in this embodiment by an elastomeric plug 270 which prevents intrusion of environmental contaminants during normal operation of the brake actuator, while still allowing any excess pressure in the power spring chamber to be vented outward to atmosphere. The plug 270 is removable to permit insertion of a manual parking brake actuator retraction tool (not illustrated) for manual withdrawal of the parking brake piston to the parking brake release position for service.

In the FIG. 2 cross-section view of the parking brake release piston 170, the capture of diaphragm 210 between the stamped parking brake piston 160 and backing plate 220 is shown, wherein the stamped parking brake piston 160 is held in position by a flange 166 of press-fit threaded bore section 165, and by the affixing of the backing plate 220 to the press-fit threaded bore section 165. The backing plate 220 may be affixed by any of several methods well known to those of ordinary skill in the art, including by press-fitting, spot welding or use of threaded portions on these components. The opposite end of the press-fit threaded bore section 165 includes a threaded section 167 which receives the manual parking brake actuator retraction tool.

Figure 3:
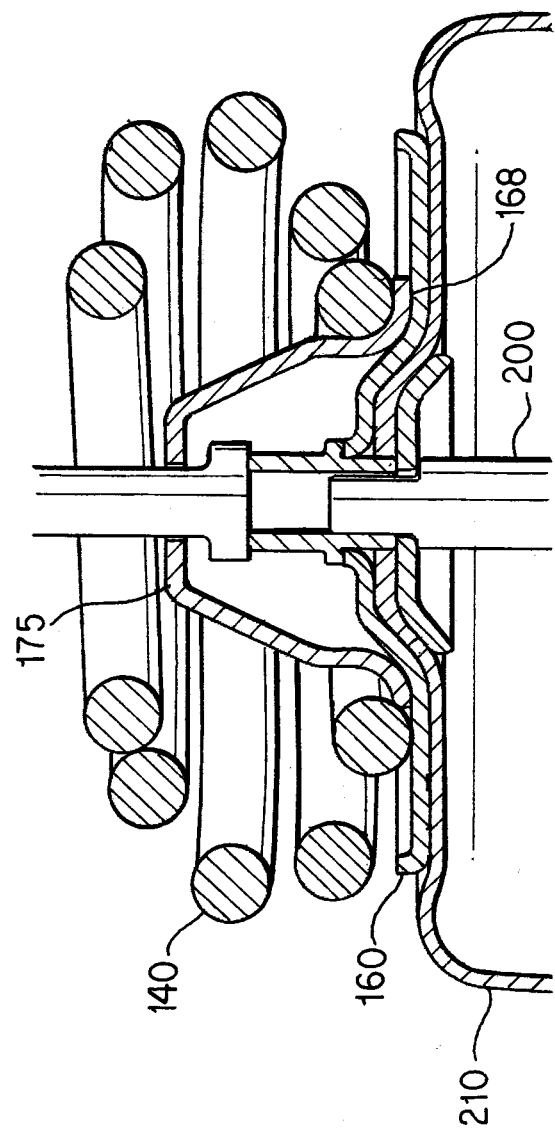
FIG. 3 is a cross-section view of a stamped parking brake piston arrangement such as that shown in FIG. 2.

The breather valve section 165 is covered by the spring seat cap 175, which, as shown in FIG. 3, receives one end of the power spring 140 in the region adjacent to the flange overlap 168 between the spring seat cap 175 and the stamped parking brake release piston 160. The thicknesses of the material of the spring seat cap 175 and the stamped parking brake release piston 160 in the flange overlap region 168 provide sufficient material thickness to support the localized high axial forces generated by the from the brake-side end of the power spring 140. For example, for a given spring strength, an thickness of 0.090-0.150 inches may be sufficient to support the spring load, where individual plates of one-half that thickness likely would not be able to sustain the spring load, at least not over the expected service life of a spring brake actuator.

During operation of the spring brake actuator 100, air is admitted to parking brake release chamber 230 to cause the parking brake release piston 170 to move toward the rear of the parking brake housing 150, thereby compressing the power spring 140 and permitting the brake actuator rod 190 to be withdrawn to release the brake. As the parking brake release piston 170 moves toward the rear of the spring housing 150, the air within the power spring chamber is compressed, and may be vented to atmosphere via port in the power spring chamber (not illustrated). As shown in FIG. 2, the disk-shaped plate 240 on the end of the parking brake application rod 200 ultimately limits the travel of the parking brake release piston 170, thereby serving to limiting the amount the spring 140 and the air in the power spring chamber are compressed, as well as performing its function of distributing the force generated by excess pressure in the parking brake release chamber 230 through the intermediate flange 110, rather than through housing 150. The travel of the parking brake release piston may be alternatively limited, for example by arranging the height of the spring seat cap 175 to correspond to the desired travel limit when the top of the cap reaches a stop surface at the rear of the spring housing 150.

The foregoing disclosure has been set forth merely to illustrate the invention and is not intended to be limiting. Because other such modifications of the disclosed embodiments incorporating the spirit and substance of the invention may occur to persons skilled in the art, the invention should be construed to include everything within the scope of the appended claims and equivalents thereof.

What is claimed is:

1. A spring brake actuator, comprising:
  an actuator intermediate flange member;
  a spring housing configured to be affixed to a first side of the actuator intermediate flange member to form a parking brake actuator chamber;
  a service brake housing configured to be affixed to a second side of the actuator intermediate flange member opposite the first side to form a service brake actuator chamber;
  a parking brake release piston comprising a stamped piston plate and a flexible diaphragm, the parking brake release piston being configured to divide the parking brake actuator chamber into a parking brake release chamber on an intermediate flange side of the parking brake release piston and a power spring chamber on an opposite side of the parking brake release piston;
  a parking brake actuating power spring arranged in the power spring chamber to bias the parking brake release piston away from a rear wall portion of the spring housing;
  a spring seat cap having at least a flange region arranged to transfer power spring biasing force between the power spring and the parking brake release piston plate in a region of an inner radius of the power spring, the spring seat cap having an axially-extending cap portion located within the inner radius of the power spring and extending from the flange region toward the spring housing rear wall portion; and
a parking brake release operating rod affixed at a first rod end to the parking brake release piston and at a second rod end to a travel limiting member in the service brake actuator chamber, the operating rod having a rod length such that the travel limiting member abuts the second side of the intermediate flange before the spring cap contacts the spring housing when the parking brake release piston is located at a fully withdrawn position.

2. The spring brake actuator of claim 1, wherein
the spring seat cap is formed from a stamped plate.

3. The spring brake actuator of claim 1, further comprising:
a backing member affixed to the parking brake release operating rod,
wherein the flexible diaphragm is located between the stamped piston plate and the backing member.

4. The spring brake actuator of claim 3, wherein
the backing member is a stamped plate.

5. The spring brake actuator of claim 4, wherein
at least one of the stamped piston plate and the backing member is formed from aluminum or steel.

6. A spring brake actuator, comprising:
a power spring arranged in a spring housing to apply a biasing force biasing a parking brake release actuator in a brake application direction;
a stamped spring seat cap having at least a flange region arranged to transfer the biasing force between the power spring and a parking brake release piston plate of the parking brake release actuator in a region of an inner radius of the power spring, the spring seat cap having an axially-extending cap portion located within the inner radius of the power spring and extending from the flange region toward the spring housing rear wall portion,
wherein the parking brake release piston plate is coupled to a parking brake release operating rod affixed at a first rod end, and
the parking brake release operating rod is coupled at a second rod end to a travel limiting member positioned in the spring brake actuator such that the travel limiting member reaches a travel stop surface prior to the spring cap contacting the spring housing.

7. The spring brake actuator of claim 6, wherein
the power spring and parking brake release actuator are arranged such that the biasing force places the stamped spring seat cap in compression.

8. The spring brake actuator of claim 7, wherein
the parking brake release actuator comprises a stamped piston plate.

9. The spring brake actuator of claim 8, wherein
the stamped piston plate and the stamped spring seat cap have material thicknesses which are individually insufficiently thick to resist the biasing force and when stacked together have a combined thickness which is sufficiently thick to resist the biasing force.

10. A vehicle brake assembly, comprising:
a brake, wherein the brake includes one of a disc brake and a drum brake; and
a spring brake actuator coupled to the brake to apply a brake actuation force, the spring brake actuator including
an actuator intermediate flange member;
a spring housing configured to be affixed to a first side of the actuator intermediate flange member to form a parking brake actuator chamber;
a service brake housing configured to be affixed to a second side of the actuator intermediate flange member opposite the first side;
a parking brake release piston comprising a stamped piston plate and a flexible diaphragm, the parking brake release piston being configured to divide the parking brake actuator chamber into a parking brake release chamber on an intermediate flange side of the parking brake release piston and a power spring chamber on an opposite side of the parking brake release piston;
a parking brake actuating power spring arranged in the power spring chamber to bias the parking brake release piston away from a rear wall portion of the spring housing; and
a spring seat cap having at least a flange region arranged to transfer power spring biasing force between the power spring and the parking brake release piston plate in a region of an inner radius of the power spring, the spring seat cap having an axially-extending cap portion located within the inner radius of the power spring and extending from the flange region toward the spring housing rear wall portion; and
a parking brake release operating rod affixed at a first rod end to the parking brake release piston and at a second rod end to a travel limiting member in the service brake actuator chamber, the operating rod having a rod length such that the travel limiting member abuts the second side of the intermediate flange before the spring cap contacts the spring housing when the parking brake release piston is located at a fully withdrawn position.

11. The spring brake actuator of claim 10, wherein
the spring seat cap is formed from a stamped plate.

12. The vehicle brake assembly of claim 11, further comprising:
a backing member affixed to the parking brake release operating rod,
wherein the flexible diaphragm is located between the stamped piston plate and the backing member.

13. A vehicle axle assembly, comprising:
a vehicle axle;
a brake coupled to the vehicle axle, wherein the brake includes one of a disc brake and a drum brake; and
a spring brake actuator coupled to the brake to apply a brake actuation force, the spring brake actuator including
an actuator intermediate flange member;
a spring housing configured to be affixed to a first side of the actuator intermediate flange member to form a parking brake actuator chamber;
a service brake housing configured to be affixed to a second side of the actuator intermediate flange member opposite the first side;
a parking brake release piston comprising a stamped piston plate and a flexible diaphragm, the parking brake release piston being configured to divide the parking brake actuator chamber into a parking brake release chamber on an intermediate flange side of the parking brake release piston and a power spring chamber on an opposite side of the parking brake release piston;
a parking brake actuating power spring arranged in the power spring chamber to bias the parking brake release piston away from a rear wall portion of the spring housing; and
a spring seat cap having at least a flange region arranged to transfer power spring biasing force between the power spring and the parking brake release piston plate in a region of an inner radius of the power spring, the spring seat cap having an axially-extending cap portion located within the inner radius of the power spring and extending from the flange region toward the spring housing rear wall portion; and a parking brake release operating rod affixed at a first rod end to the parking brake release piston and at a second rod end to a travel limiting member in the service brake actuator chamber, the operating rod having a rod length such that the travel limiting member abuts the second side of the intermediate flange before the spring cap contacts the spring housing when the parking brake release piston is located at a fully withdrawn position.

14. The vehicle brake assembly of claim 13, further comprising:

a backing member affixed to the parking brake release operating rod, wherein the flexible diaphragm is located between the stamped piston plate and the backing member.

15. A spring brake actuator, comprising:

a parking brake release pressure chamber, wherein application of parking brake release pressure to the parking brake release pressure chamber biases a brake actuator power spring in a brake release direction;

a service brake pressure chamber, wherein application of service brake pressure to the service brake pressure chamber displaces a brake actuator rod in a brake application direction; and a travel limiting member located on a service brake chamber side of an intermediate flange of the spring brake actuator, the travel limiting member being arranged to limit a motion of a parking brake release piston disposed on a parking brake release chamber side of the intermediate flange to a predetermined parking brake release piston fully withdrawn position in which neither the parking brake release piston nor a component in contact with a central region of the parking brake release piston, other than the brake actuator power spring, is in contact with an end wall of the spring brake actuator.

16. The spring brake actuator of claim 15, wherein the travel limiting member is affixed to a first rod end of a parking brake release operating rod, a second rod end of the operating rod being affixed to a parking brake release piston forming at least one surface of the parking brake release pressure chamber, the operating rod having a rod length such that the travel limiting member abuts a structure of the spring brake actuator before the parking brake release piston or a component in contact with the central region of the parking brake release piston, other than the brake actuator power spring, is in contact with the end wall of the spring brake actuator when the parking brake release piston is located at a fully withdrawn position.

17. A spring brake actuator, comprising:

an actuator intermediate flange member;

a spring housing configured to be affixed to a first side of the actuator intermediate flange member to form a parking brake actuator chamber;

a service brake housing configured to be affixed to a second side of the actuator intermediate flange member opposite the first side to form a service brake actuator chamber;

a parking brake release means located within the parking brake actuator chamber for releasing a parking brake function of the spring brake actuator in response to application of fluidic pressure; and a parking brake actuating means located in the parking brake actuator chamber for applying the parking brake function, wherein the parking brake release means includes stamped plate members with a spring seat cap having at least a flange region arranged to transfer a biasing force of a power spring to at least one of the stamped plate members in a region of an inner radius of the power spring, the spring seat cap having an axially-extending cap portion located within the inner radius of the power spring and extending from the flange region toward a rear wall portion of the spring housing; and the parking brake release means includes a travel limiting means in the service brake actuator chamber arranged to abut the second side of the intermediate flange before the spring cap contacts the spring housing when the parking brake release means is located at a fully withdrawn position.

18. A method of operating a spring brake actuator, comprising the acts of:

providing a spring brake actuator, the spring brake actuator comprising:

an actuator intermediate flange member;

a spring housing configured to be affixed to a first side of the actuator intermediate flange member to form a parking brake actuator chamber;

a service brake housing configured to be affixed to a second side of the actuator intermediate flange member opposite the first side to form a service brake actuator chamber;

a parking brake release piston comprising a stamped piston plate and a flexible diaphragm, the parking brake release piston being configured to divide the parking brake actuator chamber into a parking brake release chamber on an intermediate flange side of the parking brake release piston and a power spring chamber on an opposite side of the parking brake release piston;

a parking brake actuating power spring arranged in the power spring chamber to bias the parking brake release piston away from a rear wall portion of the spring housing;

a spring seat cap having at least a flange region arranged to transfer power spring biasing force between the power spring and the parking brake release piston plate in a region of an inner radius of the power spring, the spring seat cap having an axially-extending cap portion located within the inner radius of the power spring and extending from the flange region toward the spring housing rear wall portion; and a parking brake release operating rod affixed at a first rod end to the parking brake release piston and at a second rod end to a travel limiting member in the service brake actuator chamber, the operating rod having a rod length such that the travel limiting member abuts the second side of the intermediate flange before the spring cap contacts the spring housing when the parking brake release piston is located at a fully withdrawn position;

applying fluidic pressure to the parking brake release chamber to cause the parking brake release piston to compress the power spring;

releasing the fluidic pressure in the parking brake release chamber to cause the power spring to displace the parking brake release piston away from the rear wall portion of the spring housing.

* * * * *